United States Patent
Munchel et al.

(10) Patent No.: US 8,950,765 B2
(45) Date of Patent: Feb. 10, 2015

(54) MOUNTING BRACKET ASSEMBLY FOR VEHICLE SUSPENSION COMPONENT AS WELL AS SUSPENSION ASSEMBLY, KIT AND METHOD INCLUDING SAME

(75) Inventors: Brad W. Munchel, Avon, IN (US); Joseph A. Bounds, Fishers, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 13/990,763

(22) PCT Filed: Nov. 30, 2011

(86) PCT No.: PCT/US2011/062672
§ 371 (c)(1),
(2), (4) Date: May 30, 2013

(87) PCT Pub. No.: WO2012/075160
PCT Pub. Date: Jun. 7, 2012

(65) Prior Publication Data
US 2013/0249184 A1  Sep. 26, 2013

Related U.S. Application Data

(60) Provisional application No. 61/418,199, filed on Nov. 30, 2010.

(51) Int. Cl.
*B60G 11/28* (2006.01)
*B60G 11/27* (2006.01)

(52) U.S. Cl.
CPC ............... *B60G 11/28* (2013.01); *B60G 11/27* (2013.01); *B60G 2202/152* (2013.01); *B60G 2204/126* (2013.01); *B60G 2204/4502* (2013.01)
USPC ................................ 280/124.157; 267/64.27

(58) Field of Classification Search
CPC ............ B60G 11/28; B60G 2204/128; B60G 2204/129; F16F 9/0454
USPC ................... 280/124.157, 124.158; 267/64.27
See application file for complete search history.

(56) References Cited

U.S. PATENT DOCUMENTS

| | | | |
|---|---|---|---|
| 3,653,683 A | | 4/1972 | Hendrickson |
| 4,506,910 A | * | 3/1985 | Bierens ................. 280/124.116 |
| 5,087,074 A | | 2/1992 | Komatsu et al. |
| 5,342,139 A | * | 8/1994 | Hoffman ...................... 403/327 |
| 5,941,510 A | * | 8/1999 | Grass et al. ................. 267/64.27 |
| 6,070,861 A | * | 6/2000 | Ecktman ......................... 60/778 |
| 6,592,112 B2 | * | 7/2003 | Bishop et al. ................. 267/220 |

(Continued)

FOREIGN PATENT DOCUMENTS

EP  1041308 A1 * 10/2000

OTHER PUBLICATIONS

International Search Report.

*Primary Examiner* — James English
(74) *Attorney, Agent, or Firm* — Jason A. Houser; Fay Sharpe LLP

(57) ABSTRACT

A mounting bracket assembly, such as for securing a suspension component to a receiving element of sprung or unsprung mass of a vehicle, can include an internal mounting element. An external mounting element can be secured to the receiving element using a securement element. A suspension assembly for a vehicle and a method of assembly including such a mounting bracket assembly are also included. A mounting bracket kit is also included.

20 Claims, 9 Drawing Sheets

(56) References Cited

U.S. PATENT DOCUMENTS

| | | | |
|---|---|---|---|
| 6,942,201 B2* | 9/2005 | Leonard | 267/64.27 |
| 6,945,548 B2 | 9/2005 | Dudding et al. | |
| 7,614,630 B2 | 11/2009 | Myers | |
| 2012/0200020 A1* | 8/2012 | Peeters et al. | 267/122 |
| 2012/0205844 A1* | 8/2012 | Koeske et al. | 267/122 |

* cited by examiner

MOUNTING BRACKET ASSEMBLY FOR VEHICLE SUSPENSION COMPONENT AS WELL AS SUSPENSION ASSEMBLY, KIT AND METHOD INCLUDING SAME

BACKGROUND

The subject matter of the present disclosure broadly relates to the art of vehicle suspension systems and, more particularly, to a mounting bracket assembly for securing a suspension component to a sprung or unsprung mass of a vehicle. A suspension assembly for a vehicle, a mounting bracket kit and a method of assembly are also included.

The present invention finds particular application and use in conjunction with suspension systems of wheeled vehicles, and will be described herein with specific reference thereto. However, it is to be appreciated that the present invention is also amenable to other applications and environments, and that the specific uses shown and described herein are merely exemplary.

It is well known that land vehicles of most types and kinds are outfitted with a suspension system that supports a sprung mass (e.g., a body or chassis) of the vehicle on an unsprung mass (e.g., axles or wheel-engaging members) of the vehicle. It is also well known to use supplemental suspension springs, which are sometimes referred to in the art as "helper springs", on vehicles, such as in applications in which a vehicle will be fitted with additional equipment or routinely transport higher weight loads, for example. It will be appreciated that such supplemental suspension springs can be mounted on existing vehicles and/or vehicle structures in any one of a variety of ways and/or using any one of a variety of known mounting arrangements.

One disadvantage of known supplemental suspension systems, however, is that installation of the same often requires substantial disassembly of existing suspension components of the vehicle. This can, in some cases, significantly increase the time and effort involved in installing the supplemental suspension system. Additionally, this can undesirably increase the level of complexity of the installation, which could, in some cases, exceed the capability and/or comfort level of some self-installers.

What's more, some of the components that are disassembled may be discarded and replaced by new components that are supplied with the supplemental suspension system that is being installed on the vehicle. Sometimes, the new components are significantly different than the existing components. However, in many cases the new components are quite similar to the original parts and only include minor changes or modifications thereto, such as for mounting the supplemental suspension system or components thereof on the associated vehicle, for example. However, it is generally deemed undesirable to modify the original or existing parts of a vehicle (i.e., a field modification made by the installer at the time of installation) as this can significantly increase the level of complexity and/or effort involved in the installation. As such, new components are typically included with the supplemental suspension system and the original components discarded. This, however, leads to an undesirable increase in the costs associated with the supplemental suspension system. Additionally, such arrangements also undesirably result in the discarding of otherwise usable parts and/or components.

As such, it is believed desirable to develop a mounting bracket assembly as well as a suspension assembly, a mounting bracket kit and a method of installation using such a mounting bracket assembly that may improve factors such as time, complexity and/or ease of installation, that may increase the usage of existing vehicle components, and/or that may overcome the foregoing and other disadvantages of known arrangements.

SUMMARY OF THE INVENTION

One example of a suspension assembly that is operatively disposed between associated sprung and unsprung masses of an associated vehicle can include a receiving element, an internal mounting element and a suspension component. The receiving element can be operatively connected to one of the associated sprung and unsprung masses. The receiving element can have a longitudinal axis and can include an end wall disposed in transverse relation to the axis. The receiving element can also include a side wall extending axially from along the end wall toward an open end such that a receiving cavity is at least partially defined within the receiving element by the side wall. The receiving element can also include a plurality of retainment surfaces that face toward the end wall and are disposed in spaced relation to one another along the side wall within the receiving cavity such that a plurality of gaps are formed therebetween. The receiving element can be oriented such that the end wall is disposed toward the one of the associated sprung and unsprung masses and such that the open end is disposed toward the other of the associated sprung and unsprung masses. The internal mounting element can be at least partially received in the receiving cavity of the receiving element. The internal mounting element can include a first side, a second side opposite the first side, an outer peripheral edge extending between the first and second sides and a plurality of recesses extending into the internal mounting element along the first side adjacent the outer peripheral edge. The outer peripheral edge can at least partially define a plurality of projections and a plurality of interprojection spaces that are disposed about the internal mounting element with one of the plurality of interprojection spaces disposed between adjacent ones of the plurality of projections. The internal mounting element can be oriented within the receiving cavity of the receiving element such that the second side is disposed toward the end wall and such that at least one of the plurality of retainment surfaces is received in one of the plurality recesses along the first side of the internal mounting element. The suspension component can be operatively secured to the one of the associated sprung and unsprung masses through at least the internal mounting element and the receiving element. The suspension component can be adapted to operatively engage the other of the associated sprung and unsprung masses.

One example of a mounting bracket assembly for securing an associated suspension component along one of an associated sprung mass and an associated unsprung mass of an associated vehicle can include an internal mounting element, an external mounting element and a securement element. The one of the associated sprung and unsprung masses can include an associated receiving element having a longitudinal axis and including an end wall disposed in transverse relation to the axis, a side wall extending axially from along the end wall toward an open end such that a receiving cavity is at least partially defined within the receiving element by the side wall, and a plurality of retainment surfaces facing toward the end wall and disposed in spaced relation to one another along the side wall within the receiving cavity such that a plurality of gaps are formed therebetween. The associated receiving element can be oriented such that the end wall is disposed toward the one of the associated sprung and unsprung masses and such that the open end is disposed toward the other of the associated sprung and unsprung masses. The internal mounting element can include a first side, a second side opposite the first side, a securement feature accessible from along at least one of the first and second sides, an outer peripheral edge extending between the first and second sides and a plurality of recesses extending into the internal mounting element along the first side adjacent the outer peripheral edge. The outer peripheral edge at least partially defining a plurality of projections and a plurality of interprojection spaces disposed about the internal mounting element with one of the plurality of interprojection spaces disposed between adjacent ones of the plurality of projections. The plurality of projections can be dimensioned for passage through the plurality of gaps formed between adjacent ones of the plurality of retainment surfaces of the associated receiving element such that the internal mounting element can be oriented within the receiving cavity of the receiving element with the second side disposed toward the end wall of the associated receiving element and such that at least one of the plurality of retainment surfaces can be received in one of the plurality recesses along the first side of the internal mounting element. The external mounting element can include a base wall dimensioned for securement on the one of the associated sprung and unsprung masses adjacent the associated receiving element and can be securable in spaced relation to the internal mounting element. The base wall can include a first side disposed in facing relation to the internal mounting element, a second side opposite the first side and a passage that extends through the base wall such that the securement feature of the internal mounting element is accessible through the passage. The securement element can be dimensioned to engage the securement feature of the internal mounting element. The internal mounting element and the external mounting element can be thereby secured in spaced relation to one another on the one of the associated sprung and unsprung masses adjacent the associated receiving element.

One example of an internal mounting bracket for securing an associated suspension component along one of an associated sprung mass and an associated unsprung mass of an associated vehicle can include an internal mounting element and at least one biasing element. The one of the associated sprung and unsprung masses can include an associated receiving element having a longitudinal axis and including an end wall disposed in transverse relation to the axis, a side wall extending axially from along the end wall toward an open end such that a receiving cavity is at least partially defined within the receiving element by the side wall, and a plurality of retainment surfaces facing toward the end wall and disposed in spaced relation to one another along the side wall within the receiving cavity such that a plurality of gaps are formed therebetween. The associated receiving element can be oriented such that the end wall is disposed toward the one of the associated sprung and unsprung masses and such that the open end is disposed toward the other of the associated sprung and unsprung masses. The internal mounting element can include a first side, a second side opposite the first side, a securement feature accessible from along at least one of the first and second sides, an outer peripheral edge extending between the first and second sides and a plurality of recesses extending into the internal mounting element along the first side adjacent the outer peripheral edge. The outer peripheral edge can at least partially define a plurality of projections and a plurality of interprojection spaces disposed about the internal mounting element with one of the plurality of interprojection spaces disposed between adjacent ones of the plurality of projections. The plurality of projections can be dimensioned for passage through the plurality of gaps formed between adjacent ones of the plurality of retainment surfaces of the associated receiving element such that the internal mounting element can be oriented within the receiving cavity of the receiving element with the second side disposed toward the end wall of the associated receiving element and such that at least one of the plurality of retainment surfaces can be received in one of the plurality recesses along the first side of the internal mounting element. The at least one biasing element can operatively engage the internal mounting element such that the at least one biasing element projects outwardly beyond the second side of the internal mounting element and can abuttingly engage at least one of the associated receiving element and the one of the associated sprung and unsprung masses.

One example of a mounting bracket kit for securement along one of an associated sprung mass and an associated unsprung mass of an associated vehicle can include an internal mounting element, an external mounting element, a securement element and directions. The one of the associated sprung and unsprung masses can include an associated receiving element having a longitudinal axis and including an end wall disposed in transverse relation to the axis, a side wall extending axially from along the end wall toward an open end such that a receiving cavity is at least partially defined within the receiving element by the side wall, and a plurality of retainment surfaces facing toward the end wall and disposed in spaced relation to one another along the side wall within the receiving cavity such that a plurality of gaps are formed therebetween. The associated receiving element can be oriented such that the end wall is disposed toward the one of the associated sprung and unsprung masses and such that the open end is disposed toward the other of the associated sprung and unsprung masses. The internal mounting element can include a first side, a second side opposite the first side, a securement feature accessible from along at least one of the first and second sides, an outer peripheral edge extending between the first and second sides and a plurality of recesses extending into the internal mounting element along the first side adjacent the outer peripheral edge. The outer peripheral edge can at least partially define a plurality of projections and a plurality of interprojection spaces disposed about the internal mounting element with one of the plurality of interprojection spaces disposed between adjacent ones of the plurality of projections. The plurality of projections can be dimensioned for passage through the plurality of gaps formed between adjacent ones of the plurality of retainment surfaces of the associated receiving element such that the internal mounting element can be oriented within the receiving cavity of the receiving element with the second side is disposed toward the end wall of the associated receiving element and such that at least one of the plurality of retainment surfaces can be received in one of the plurality recesses along the first side of the internal mounting element. The external mounting element can include a base wall dimensioned for securement on the one of the associated sprung and unsprung masses adjacent the associated receiving element and securable in spaced relation to the internal mounting element. The base wall can include a first side disposed in facing relation to the internal mounting element, a second side opposite the first side and a passage that extends through the base wall such that the securement feature of the internal mounting element is accessible therethrough. The securement element can be dimensioned to engage the securement feature of the internal mounting element and thereby secure the internal mounting element and the external mounting element in spaced relation to one another on the one of the associated sprung and unsprung masses adjacent the associated receiving element.

The directions can be for securing the internal mounting element and the external mounting elements on the one of the associate sprung and unsprung masses.

One example of a method of securing a suspension component along one of a sprung mass and an unsprung mass of a vehicle is provided. The one of a sprung mass and unsprung mass can include a receiving element having a longitudinal axis and that includes an end wall disposed in transverse relation to the axis, a side wall extending axially from along the end wall toward an open end such that a receiving cavity is at least partially defined within the receiving element by the side wall, and a plurality of retainment surfaces facing toward the end wall and disposed in spaced relation to one another along the side wall within the receiving cavity such that a plurality of gaps are formed therebetween. The receiving element can be oriented such that the end wall is disposed toward the one of the associated sprung and unsprung masses and such that the open end is disposed toward the other of the associated sprung and unsprung masses. The method can include providing an internal mounting element that includes a first side, a second side opposite the first side, a securement feature accessible from along at least one of the first and second sides, an outer peripheral edge extending between the first and second sides and a plurality of recesses extending into the internal mounting element along the first side adjacent the outer peripheral edge. The outer peripheral edge can at least partially define a plurality of projections and a plurality of interprojection spaces disposed about the internal mounting element. The plurality of projections can be disposed in spaced relation to one another such that one of the plurality of interprojection spaces disposed between adjacent ones of the plurality of projections. The method can also include positioning the internal mounting element such that the second side is in facing relation with the end wall of the receiving element. The method can further include orienting the internal mounting element such that the plurality of projections are at least approximately aligned with the plurality of gaps along the side wall of the receiving element. The method can also include inserting the internal mounting element into the receiving cavity of the receiving element such that at least a portion of the first side is disposed axially inwardly beyond the plurality of retainment surfaces of the receiving element. The method can further include displacing the internal mounting element such that at least one of the plurality of recesses is disposed in approximate alignment with one of the plurality of retainment surfaces. The method can also include displacing the internal mounting element in a direction away from the end wall of the receiving element such that the internal mounting element abuttingly engages at least one of the plurality of retainment surfaces of the receiving element. The method can further include operatively securing a suspension component along the one of the sprung and unsprung masses using the securement feature of the internal mounting element.

DETAILED DESCRIPTION

Figure 1:
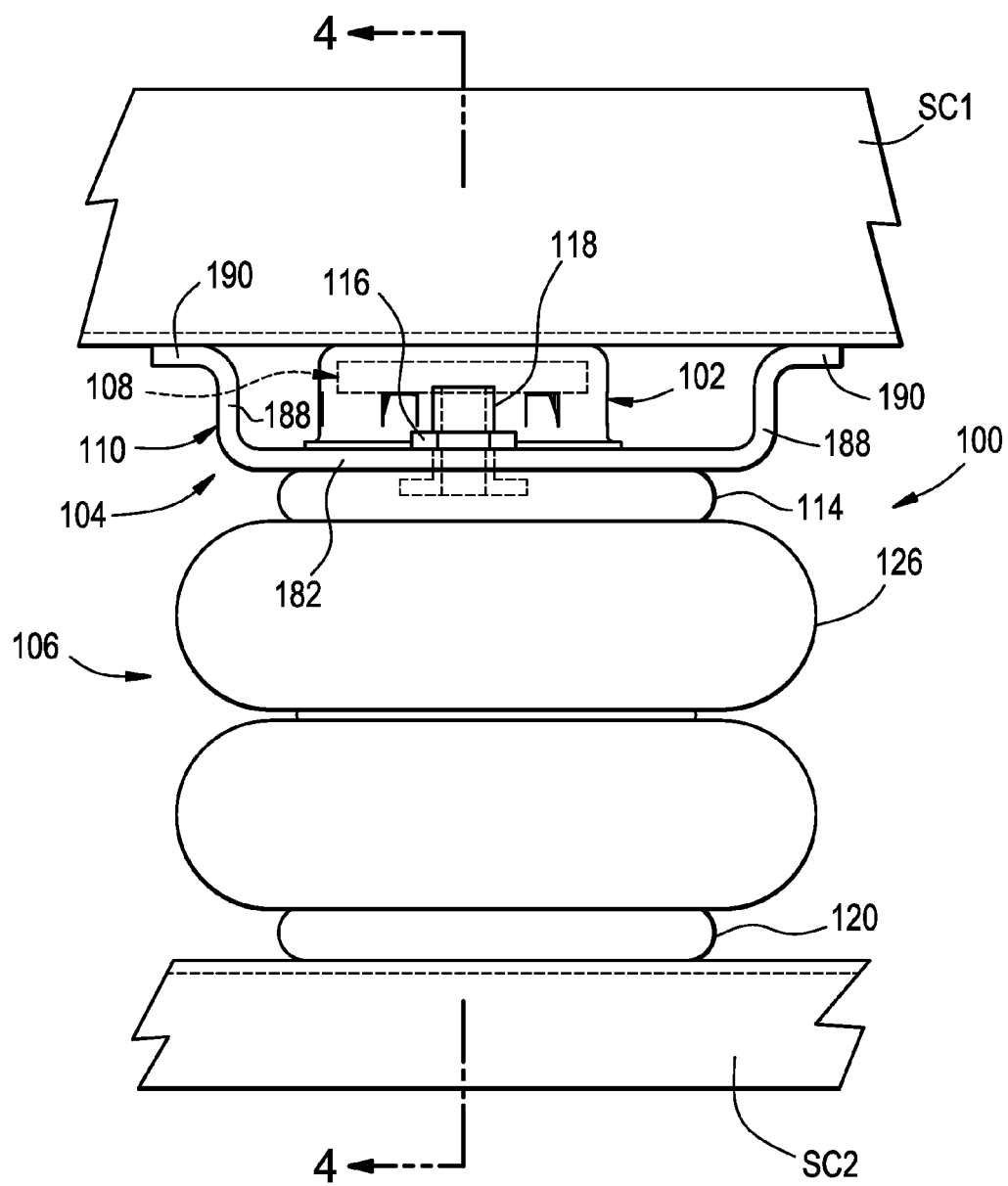
FIG. 1 is a side elevation view of one example of a suspension assembly including a mounting bracket assembly in accordance with the subject matter of the present disclosure shown in use supporting a gas spring assembly along a structural component of a vehicle.
Figure 2:
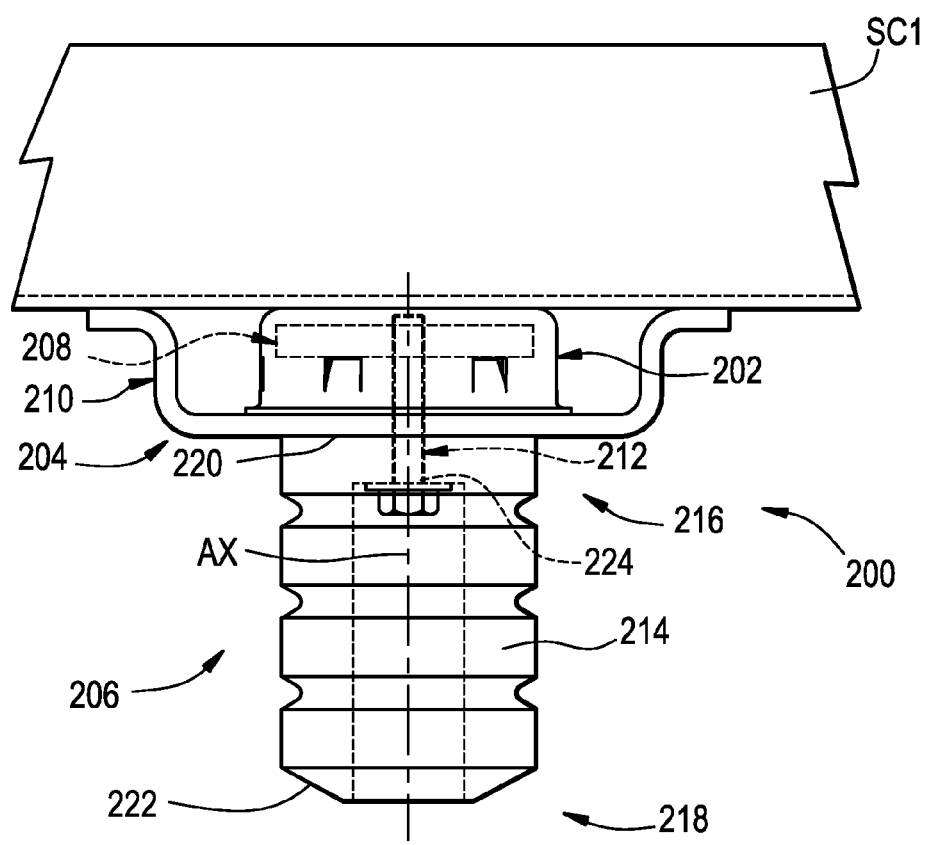
FIG. 2 is a side elevation view of another example of a suspension assembly including a mounting bracket assembly in accordance with the subject matter of the present disclosure shown supporting a jounce bumper along a structural component of a vehicle.
Figure 3:
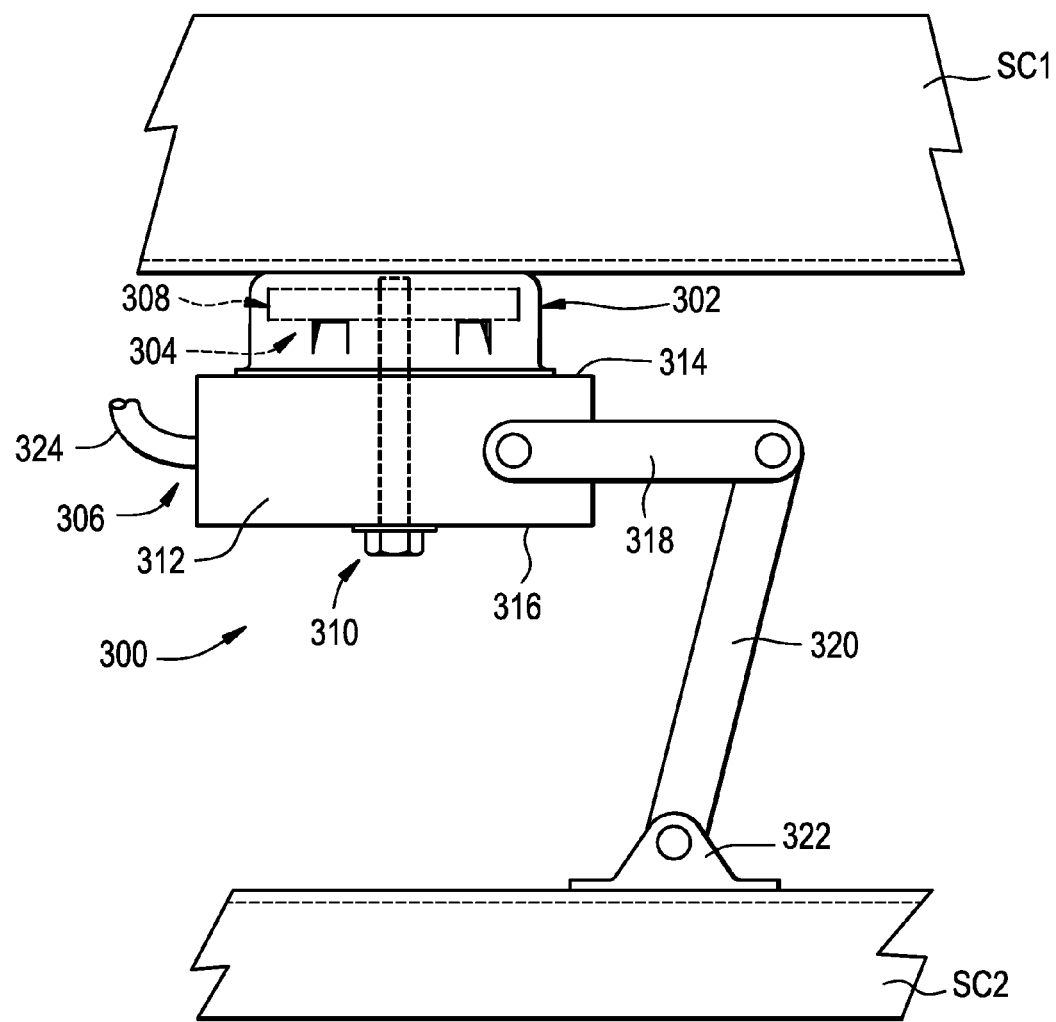
FIG. 3 is a side elevation view of a further example of a suspension assembly including a mounting bracket assembly in accordance with the subject matter of the present disclosure shown supporting a height sensing device along a structural component of a vehicle.

Turning, now, to the drawings, wherein the showings are provided for the purpose of illustrating examples of the subject matter of the present disclosure and which are not to be interpreted as limiting, FIGS. 1-3 illustrate examples of suspension assemblies secured between opposing structural components, such as a structural component SC1 and a structural component SC2 that is spaced apart from structural component SC1 and displaceable relative thereto such that one or both of the structural components can be moved relative to the other. As indicated above, structural components SC1 and SC2 can be representative of structural components of a vehicle. For example, structural component SC1 can represent one of a sprung mass and an unsprung mass of a vehicle, and structural component SC2 can represent the other of the sprung mass and the unsprung mass of a vehicle. However, other arrangements and/or configurations could alternately be used.

Figure 4:
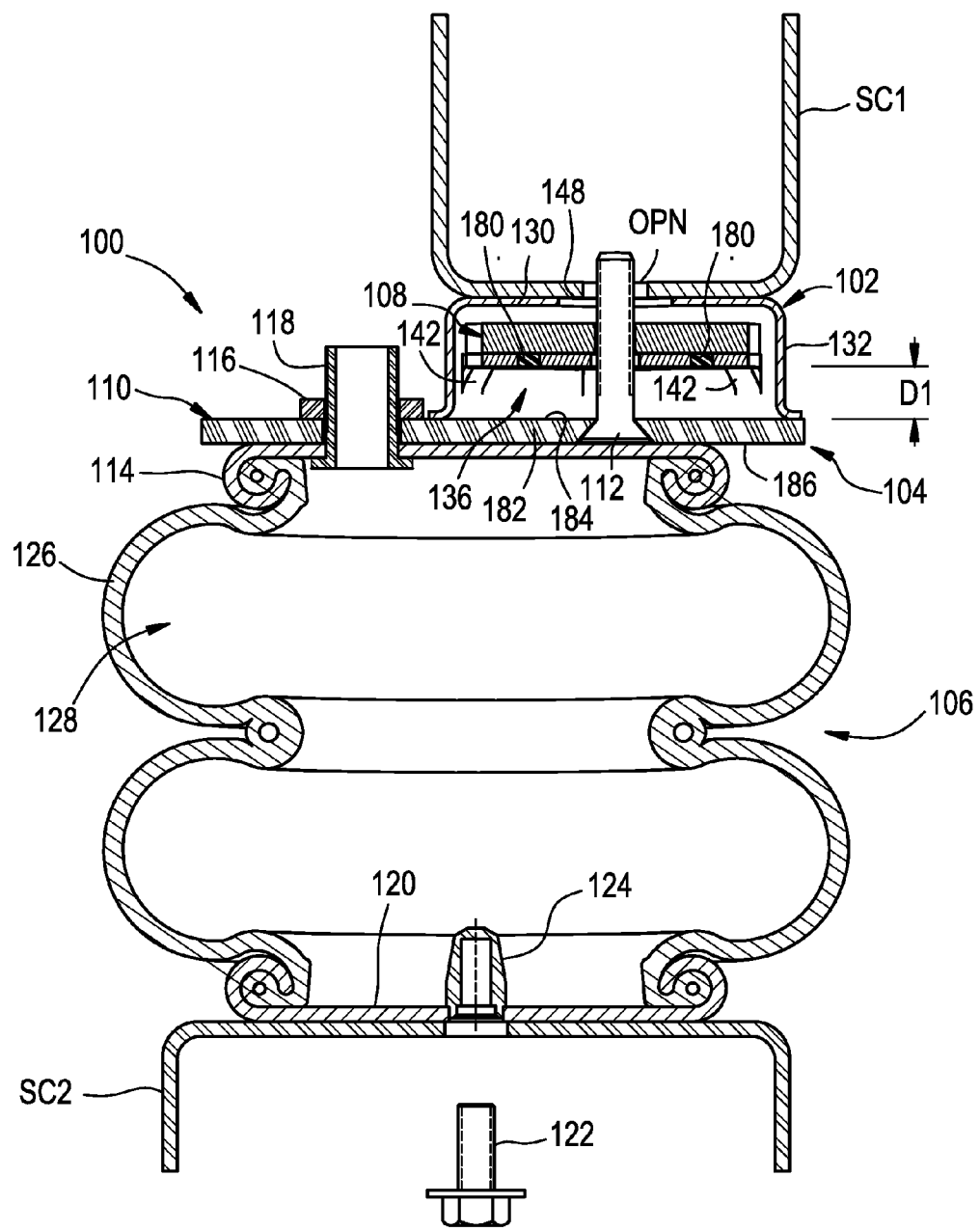
FIG. 4 is a cross-sectional view of the exemplary suspension assembly in FIG. 1 taken from along line 4-4 thereof illustrating one example of an internal mounting element of the exemplary mounting bracket assembly operatively connecting one example of an external mounting element to a mounting cup.

One example of a suspension assembly 100 is shown in FIGS. 1 and 4 as including a receiving element 102 that is affixed to structural component SC1. Suspension assembly 100 also includes a mounting bracket assembly 104 that is operatively connected to the receiving element and thereby secured along structural component SC1. A suspension component, such as a gas spring assembly 106, for example, can be operatively secured between the opposing structural components, such as by securing one portion of the suspension component along structural component SC1 through attachment to mounting bracket assembly 104 and can be operatively secured along structural component SC2 in a suitable manner. In the exemplary arrangement shown in FIGS. 1 and 4, mounting bracket assembly 104 includes an internal mounting element 108, an external mounting element 110 and a securement device 112 (FIG. 4) operatively connected between the internal and external mounting elements. It will be appreciated, however, that external mounting element 110 is optional and, as such, in other arrangements the suspension component may be secured in abutting engagement along receiving element 102 without the use of the external mounting element.

Another example of a suspension assembly 200 is shown in FIG. 2 as including a receiving element 202 that is affixed to structural component SC1, and a mounting bracket assembly 204 that is operatively connected to the receiving element and thereby secured along structural component SC1. A suspension component, such as a jounce bumper 206, for example, is operatively secured to mounting bracket assembly 204. Similar to the arrangement shown and described above in connection with FIGS. 1 and 4, mounting bracket assembly 204 in FIG. 2 includes an internal mounting element 208, an external mounting element 210 and a securement device 212 operatively connected between the internal and external mounting elements. In the exemplary embodiment shown in FIG. 2, the suspension component is supported along structural component SC1 in spaced relation to structural component SC2. In this manner, the arrangement in FIG. 2 differs from the embodiment illustrated in FIGS. 1 and 4 in which gas spring assembly 106 is operatively connected to each of structural components SC1 and SC2. It will be appreciated, however, that external mounting element 210 is optional and, as such, other arrangements the suspension component may be secured in abutting engagement along receiving element 202 without the use of the external mounting element.

A further example of a suspension assembly 300 is shown in FIG. 3 as including a receiving element 302 that is affixed to structural component SC1. A mounting bracket assembly 304 is operatively connected to the receiving element and thereby secured along structural component SC1. A suspension component, such as a height sensing device 306, for example, can be operatively secured between the opposing structural components, such as by securing one portion of the suspension component along structural component SC1 through attachment to mounting bracket assembly 304 and can be operatively secured along structural component SC2 in a suitable manner. Mounting bracket assembly 304 includes an internal mounting element 308 and a securement device 310 operatively connecting the suspension component to the internal mounting element. In this manner, the arrangement in FIG. 3 differs from the embodiments shown in FIGS. 1 and 4 and FIG. 2 in that mounting bracket assembly 304 does not include the optional external mounting element that was included in other arrangements.

It will be appreciated that the inclusion and/or use of an external mounting element, which can be optionally provided, as described above, may be employed in applications in which relatively high loads and/or forces may be transmitted, communicated or otherwise transferred from one structural component to the opposing structural component. For example, gas spring assembly 106 is shown in FIGS. 1 and 4 as including an end member 114 that is secured in abutting engagement to external mounting element 110, such as by way of a securement device 116 (e.g., a threaded nut) engaging a corresponding securement feature 118 (e.g., threaded mounting stud and fluid passage fitting) disposed along end member 114. The gas spring assembly also includes an end member 120 that is disposed in spaced relation to end member 114 and is secured on or along structural component SC2, such as by way of a securement device 122 (e.g., a threaded fastener) engaging a corresponding securement feature 124 (e.g., a threaded passage) along end member 120, as are identified in FIG. 4. Additionally, gas spring assembly 106 includes a flexible wall 126 that extends between end members 114 and 120, and is operatively connected thereto in a substantially fluid-tight manner such that a spring chamber 128 (FIG. 4) is at least partially defined therebetween. Gas spring assembly 106 is shown in FIGS. 1 and 4 as having a convoluted-type flexible wall and forming a so-called convoluted-type gas spring assembly. It will be appreciated, however, that a gas spring assembly of any other suitable type, kind and/or construction, such as a rolling lobe-type construction, for example, could alternately be included. Additionally, it will be recognized that gas spring assemblies of the aforementioned and/or other types, kinds and constructions can and do operate to transmit, communicate or otherwise transfer forces and loads to, from and between associated structural components, such as structural components SC1 and SC2, for example.

As another example, jounce bumper 206 is shown in FIG. 2 as including a bumper body 214 having a longitudinally-extending axis AX and including an end 216 disposed toward structural component SC1 and an end 218 disposed toward structural component SC2. Bumper body 214 also includes an end wall 220 along end 216 and an end wall 222 that is disposed opposite end wall 220. Bumper body 214 can be secured on mounting bracket assembly 204 in any suitable manner. For example, bumper body 214 can be oriented such that end wall 220 is disposed in abutting engagement with external mounting element 210, and bumper body 214 can include a passage 224 extending at least partially therethrough such that securement device 212 can extend at least partially through passage 224 and interengage internal mounting element 208 and/or external mounting element 210 of mounting bracket assembly 204. Additionally, bumper body 214 can be formed from any suitable material or combination of materials, such as an elastomeric material (e.g., rubber or polyurethane) and/or a thermoplastic material (e.g., nylon). It will be appreciated, however, that jounce bumper 206 is merely exemplary and that a jounce bumper of any other suitable type, kind, construction and/or configuration could alternately be used. Furthermore, it will be recognized that a jounce bumper of the aforementioned and/or other types, kinds and constructions are typically supported in spaced relation to another structural component, and upon engaging such other structural component (e.g., structural component SC2) can and do operate to transmit, communicate or otherwise transfer forces and loads to, from and between associated structural components, such as structural components SC1 and SC2, for example.

Again, it will be appreciated that the foregoing examples of suspension components (i.e., gas spring assembly 106 and jounce bumper 206) are operative to transmit, communicate or otherwise transfer relatively high loads and/or forces to, from and between the associated structural components (e.g., structural components SC1 and SC2). As such, external mounting elements 110 and 210 are shown in FIGS. 1 and 4 and FIG. 2, respectively, as being used in association with suspension components capable of carrying or otherwise applying such relatively high loads. One benefit of including an otherwise optional external mounting element is applications in which the load capacity of the receiving element (e.g., receiving element 102 and/or 202) alone may be exceeded. However, in applications in which relatively load forces and/or loads are transmitted, communicated or otherwise transferred to, from and/or between the associated structural components (e.g., structural components SC1 and SC2).

For example, height sensing device 306 is shown in FIG. 3 as including a body 312 operatively connected to receiving element 302 through attachment to mounting bracket assembly 304. Body 312 can include a body wall 314 disposed toward and in abutting engagement with receiving element 302 and an opposing body wall 316. In the exemplary embodiment shown in FIG. 3, securement device 310 extends into and through body 312 from along body wall 316 such that the securement device can operatively engage internal mounting element 308 and thereby secure height sensing device 306 on or along the receiving element. It will be appreciated that a suspension component, such as height sensing device 306, for example, can be of any suitable type, kind, construction and/or configuration. For example, height sensing device 306 is shown as including a plurality of arms or linkages that are operatively interconnected between body 312 and structural component SC2. In the exemplary arrangement shown, a linkage 318 is operatively connected to body 312, and a linkage 320 is operatively connected between linkage 318 and a pivot bracket 322 that is secured on or along structural component SC2. During use, linkages 318 and 320 pivot and move as structural components SC1 and SC2 are displaced toward and away from one another. A control signal (e.g., a pneumatic/hydraulic signal or an electrical signal) can be generated by height sensing device 306 and communicated to other systems and/or components by way of an output line 324 (e.g., a hose or wire). It will be appreciated that height sensing device 306 is merely exemplary and that any other height sensing device, other sensing device, suspension control component and/or other system of any other suitable type, kind, construction and/or configuration could alternately be used.

It will be appreciated that receiving elements 102, 202 and 302 are shown as being substantially identical to one another, and are of a typical configuration and construction for known components which may also referred to as jounce bumper mounting cups. Particular reference will be made herein to the features, elements and construction of receiving element 102. However, it is to be distinctly understood that such description is equally applicable to receiving elements 202 and 302 without further specific reference thereto. Additionally, it will be appreciated that receiving elements 102, 202 and 302 may, in some cases, be provided on or along a structural component as an original part of a vehicle or other device. In such case, the receiving element will, in many cases, be rigidly affixed to the associated structural component (e.g., structural component SC1 which may, for example, represent a sprung mass or an unsprung mass of a vehicle), such as by using a flowed-material joint and/or one or more securement devices, for example.

Figure 5:
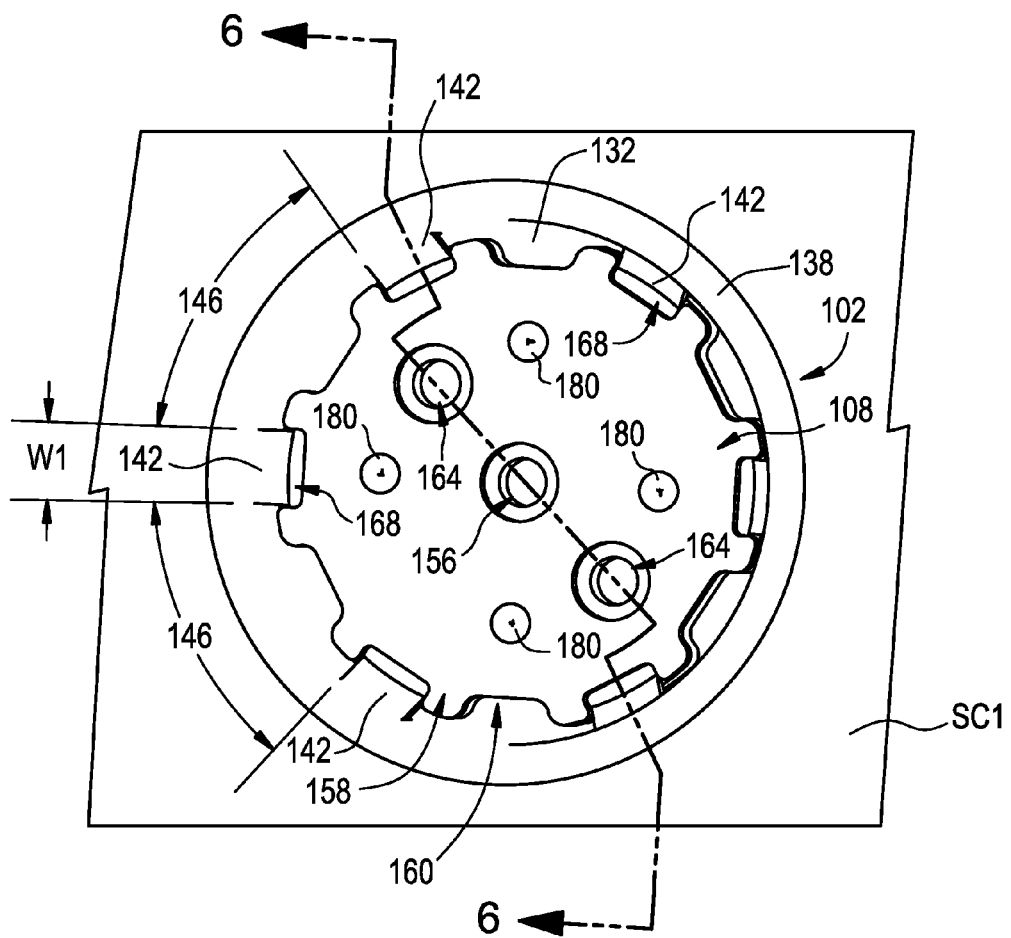
FIG. 5 is a bottom plan view of the exemplary internal mounting element and the mounting cup in FIG. 4 supported along a structural component of a vehicle.
Figure 6:
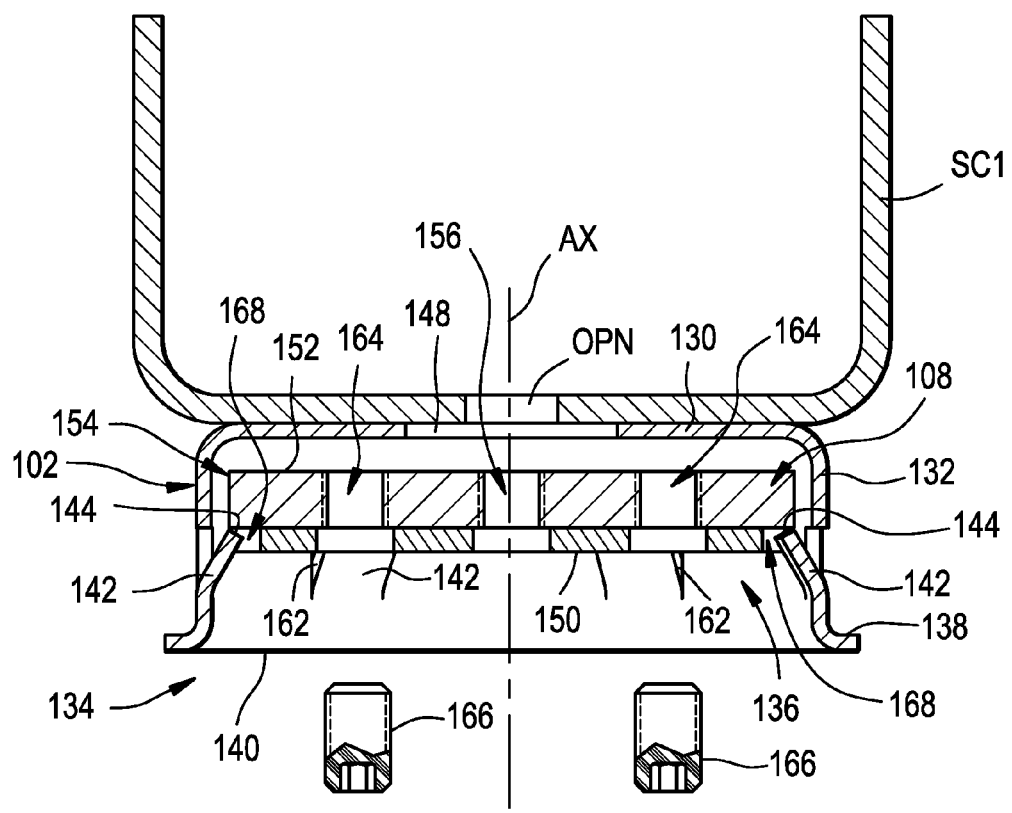
FIG. 6 is a cross-sectional side view of the exemplary internal mounting element as well as the mounting cup and structural component in FIGS. 4 and 5 taken from along line 6-6 in FIG. 5.

As is identified in FIGS. 4-6, receiving element 102 has a longitudinal axis AX (FIG. 6), and includes an end wall 130 extending approximately transverse to axis AX and a side wall 132 that extends approximately axially from along end wall 130. Side wall 132 extends about axis AX such that an open end 134 (FIG. 6) is formed opposite end wall 130 and a receiving cavity 136 is at least partially defined within receiving element 102. Side wall 132 can terminate along open end 134 at an outwardly extending flange portion 138 that at least partially defines an end surface 140 (FIG. 6) of the receiving element. Additionally, a plurality of tabs or projections 142 can extend into receiving cavity 136 from along side wall 132 and can include a retainment surface 144 (FIG. 6) disposed toward end wall 130. As identified in FIG. 5, plurality of tabs 142 are disposed in spaced apart relation to one another about axis AX and along side wall 132 such that a corresponding plurality of gaps 146 are formed about axis AX and along side wall 132 with one gap defined between adjacent ones of tabs 142. End wall 130 can optionally include one or more features, such as an opening 148 extending therethrough in approximate alignment with a corresponding, optional, opening OPN extending through structural component SC1. Openings 148 and OPN, if provided, may be useful for permitting the passage of one or more securement devices, such as securement device 112 in FIG. 4, for example.

With reference, now to FIGS. 4-11, internal mounting element 108 will be described in additional detail. It will be recognized and appreciated that internal mounting elements 208 and 308 in FIGS. 2 and 3, respectively, are substantially identical to internal mounting element 108. As such, particular reference will be made herein to features and characteristics of internal mounting element 108. It is to be distinctly understood, however, that such description is equally applicable to internal mounting elements 208 and 308 without further specific reference thereto.

Internal mounting element 108 is shown in FIGS. 4-9 as having an axis of rotation AXR (FIG. 7) and including a side 150, a side 152 (FIGS. 6 and 9) opposite side 150 and an outer peripheral edge 154 that extends generally between sides 150 and 152. Internal mounting element 108 also includes a securement feature 156 that is accessible from along at least one of sides 150 and 152. In the exemplary arrangement shown in FIGS. 4-9, securement feature 156 takes the form of a threaded passage that extends through internal mounting element 108 and is accessible from along sides 150 and 152. Alternately, the securement feature could extend partially into the internal mounting element and be accessible from along only one of the sides. As another alternate configuration, the securement feature could take the form of a projection (e.g., a threaded stud) that extends outwardly from along one of the sides.

Outer peripheral edge 154 extends about internal mounting element 108 in a somewhat wave-like pattern having a plurality of peaks and valleys. Generally, internal mounting element 108 includes a plurality of projections 158 adjacent or otherwise along the areas of the outer peripheral edge that correspond to peaks. Internal mounting element 108 also includes a plurality of interprojection spaces 160 adjacent or otherwise along the areas of the outer peripheral edge that correspond to valleys. It will be recognized from the drawing figures that each of interprojection spaces 160 is disposed between adjacent ones of projections 158.

As described above, tabs 142 extend inwardly from along side wall 132 of receiving element 102 into receiving cavity 136. While it will be appreciated that tabs 142 can be formed in any suitable manner and take any suitable shape, form and/or configuration, tabs 142 are shown as including opposing side edges 162 (FIG. 6) that at least partially define a width of the tabs, which width is represented in FIG. 5 by reference dimension IN1. Gaps 146 that are disposed between adjacent ones of tabs 142 can have a corresponding width or clearance dimension (not shown). It will be appreciated that the width or clearance dimension of gaps 146 is preferably sufficient to permit a corresponding feature of internal mounting element 108 to be received therein. Projections 158 and interprojection spaces 160 have widths corresponding thereto, which widths are respectively represented in FIG. 8 by reference dimensions W2 and W3.

Figure 7:
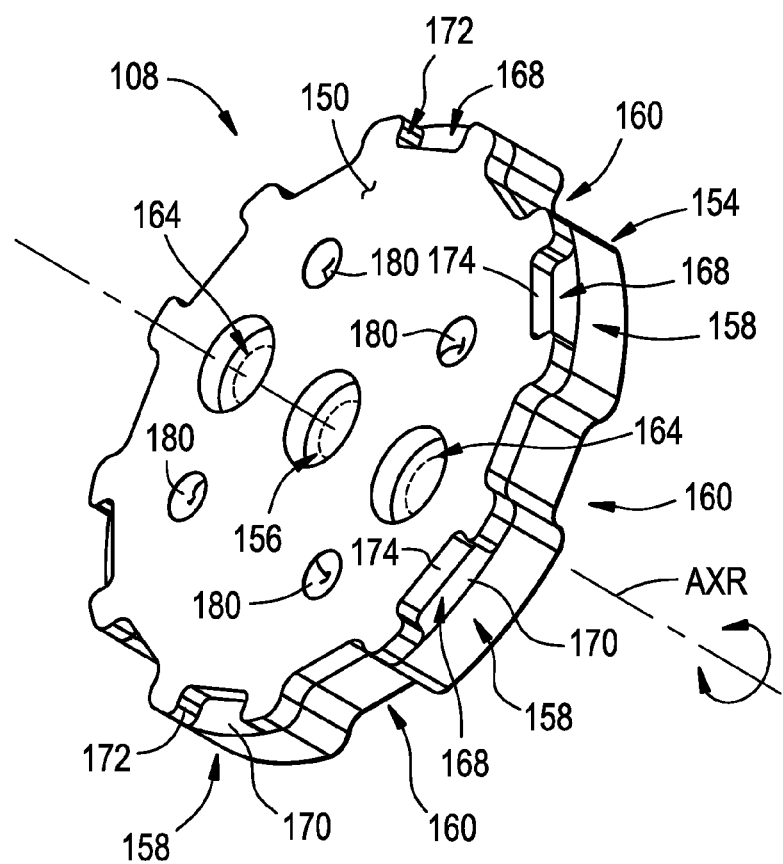
FIG. 7 is a perspective view of the exemplary internal mounting element shown in FIGS. 4-6.

In a preferred arrangement, width W2 of projections 158 is less than the width or clearance dimension (not shown) of gaps 146. Additionally, widths W3 of interprojection spaces 160 are preferably greater than width W1 of tabs 142. In such case, receiving element 102 and internal mounting element 108 will be cooperatively dimensioned with one another such that the internal mounting element can be received within receiving cavity 136 and displaced into the receiving cavity past tabs 146 that project outwardly into the receiving cavity. Additionally, tabs 142, gaps 146, projections 158 and interprojection spaces 160 are preferably cooperatively arranged such that the internal mounting element can be received within the receiving cavity and displaced past tabs 142 in at least one rotational position of the internal mounting element relative to the receiving element. In the exemplary arrangement shown, tabs 142 and gaps 146 are uniformly sized and uniformly spaced about axis AX, and projections 158 and interprojection spaces 160 are also uniformly sized and uniformly spaced about axis AXR (FIG. 7). As a result, the internal mounting element can be aligned for receipt into the receiving element in any one of a plurality of rotational positions. It will be appreciated, however, that other arrangements could alternately be used in which the tabs, gaps, projections and interprojection spaces are non-uniformly sized and/or are non-uniformly spaced. In such case, a lesser number (e.g., one or more) of rotational positions may be provided for aligning and interengaging the internal mounting element with the receiving element.

As described above, internal mounting element 108 can be positioned and/or otherwise oriented relative to receiving element 102 such that the internal mounting element can be inserted into receiving cavity 136 in an axial direction toward end wall 130. In an aligned condition (as described above), the internal mounting element can be displaced toward end wall 130 such that at least a portion of the internal mounting element extends into the receiving cavity past retainment surfaces 144. It will be recognized that in such condition, projections 158 are at least approximately aligned with corresponding gaps 146, and interprojection spaces 160 are at least approximately aligned with the retainment surfaces. To abuttingly interengage retainment surfaces 144 with internal mounting element 108, internal mounting element 108 can be rotated about axis AXR or otherwise displaced relative to receiving element 102 such that at least a portion of at least one of projections 158 overlaps at least a portion of at least one of retainment surfaces 144. In a preferred arrangement, two or more of projections 158 will each abuttingly interengage at least a substantial portion of different ones of two or more of retainment surfaces 144.

It will be appreciated that by displacing internal mounting element 108 to abuttingly interengage one or more of retainment surfaces 144 that the internal mounting element will be axially retained within the retaining cavity by the retainment surfaces. In such case, further actions of assembling the mounting bracket assembly could be performed. For example, a securement device, such as securement device 112, for example, could be interengaged with an external mounting element (e.g., external mounting element 110 or 210) and/or a suspension component (e.g., suspension component 106, 206 or 306). However, in some cases, the action of interengaging the internal mounting element, such as with a securement device 112, for example, could result in the further displacement of the internal mounting element into an aligned condition with the receiving element such that the internal mounting element could capable of axial displacement out of the receiving cavity.

Accordingly, internal mounting element 108 can include one or more features and/or elements operative to assist in maintaining the internal mounting element in an orientation that is not aligned for removal from the receiving element and/or in abutting engagement with one or more of retainment surfaces 144. For example, mounting bracket assembly 104 can optionally include one or more biasing elements that operatively engage internal mounting element 108 and that are operative to urge the internal mounting element in a predetermined direction, such as an approximately axial direction away from end wall 130, for example. Such one or more biasing elements be of any suitable type, kind, arrangement and/or construction. As one example, the one or more biasing elements could take the form of a spring (not shown) that is operatively connected between receiving element 102 and internal mounting element 108, such as by being compressively positioned between end wall 130 of the receiving element and side 152 of the internal mounting element, for example. As another example, internal mounting element 108 can include one or more threaded passages 164 extending therethrough. One or more set screws 166 (FIG. 6) or other suitable threaded fasteners could be threadably engaged with threaded passages 164. The one or more set screws can be configured such that a portion thereof projects outwardly beyond side 152 of the internal mounting element and can abuttingly engage end wall 130 of receiving element 102. The one or more set screws can then be adjusted such that internal mounting element 108 is forced into abutting engagement with retainment surfaces 144.

Additionally, or in the alternative, internal mounting element 108 can optionally include one or more recesses 168 or other features provided on or along side 150 of the internal mounting element for receiving at least a portion of at least one of tabs 142 and/or otherwise abuttingly engaging one or more of retainment surfaces 144. In the exemplary arrangement shown, internal mounting element 108 includes a plurality of recesses 168 that are disposed in spaced relation to one another about axis AXR with one recess disposed along each of projections 158. Again, recesses 168 are uniformly sized and uniformly spaced such that different ones of retainment surfaces 144 can be received in corresponding different ones of recesses 168. As discussed above in connection with the tabs, gaps, projections and interprojection spaces, however, non-uniform sizing and/or non-uniform spacing could alternately be used for recesses 168.

Figure 8:
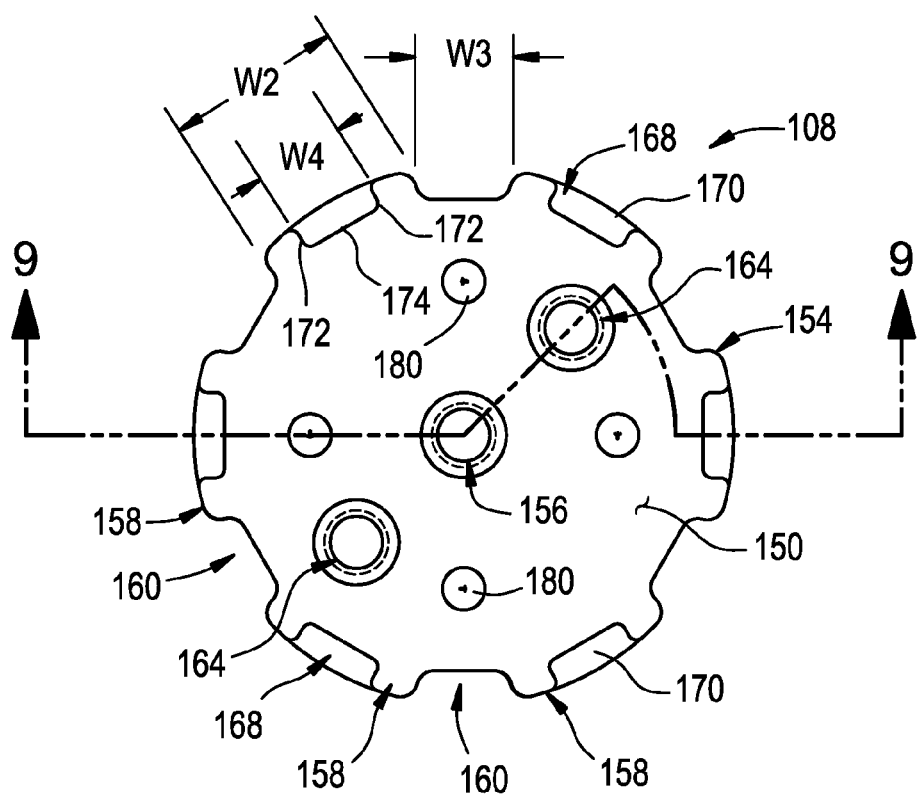
FIG. 8 is a top plan view of the exemplary internal mounting element shown in FIGS. 4-7.
Figure 9:
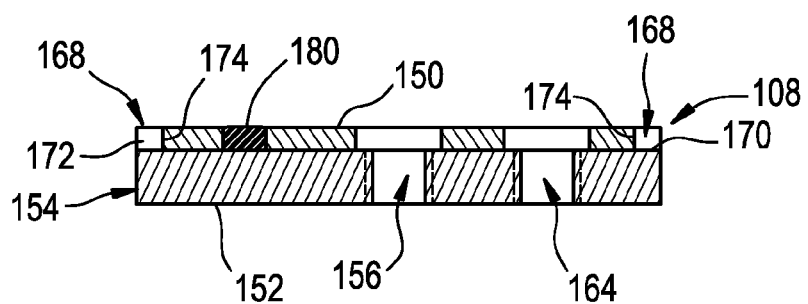
FIG. 9 is a cross-sectional side view of the exemplary internal mounting element shown in FIGS. 4-8.

Recesses 168 are shown as including a bottom surface 170, opposing side surfaces 172 and an inner end surface 174. In a preferred arrangement, side surfaces 172 will be spaced apart such that the recesses have a width, which is represented in FIG. 8 by reference dimension W4, that is greater than width W1 of tabs 142 such that one or more of the tabs can be at least partially received within a corresponding one of the recesses. In this manner, retainment surface 144 of the tab can abuttingly engage bottom surface 170 of the corresponding recess. Additionally, side edges 162 of tabs 142 can at least partially overlap with side surfaces 172 of the recesses. In such case, tabs 142 can act as anti-rotation features that will operate to maintain the internal mounting element in an approximately fixed orientation.

It will be appreciated that internal mounting element 108 as well as recesses 168 thereof, if provided, can be formed in any suitable manner and from any material or combination of materials that are suitable for withstanding the forces and/or loads applied thereto. For example, the internal mounting element could be formed from a polymeric material. In such case, recesses 168, if provided, could be formed in the internal mounting element, such as during an injection molding process, for example. As another example, the internal mounting element could be formed from a metal material with one or more of the features machined into an otherwise unitary mass.

Figure 10:
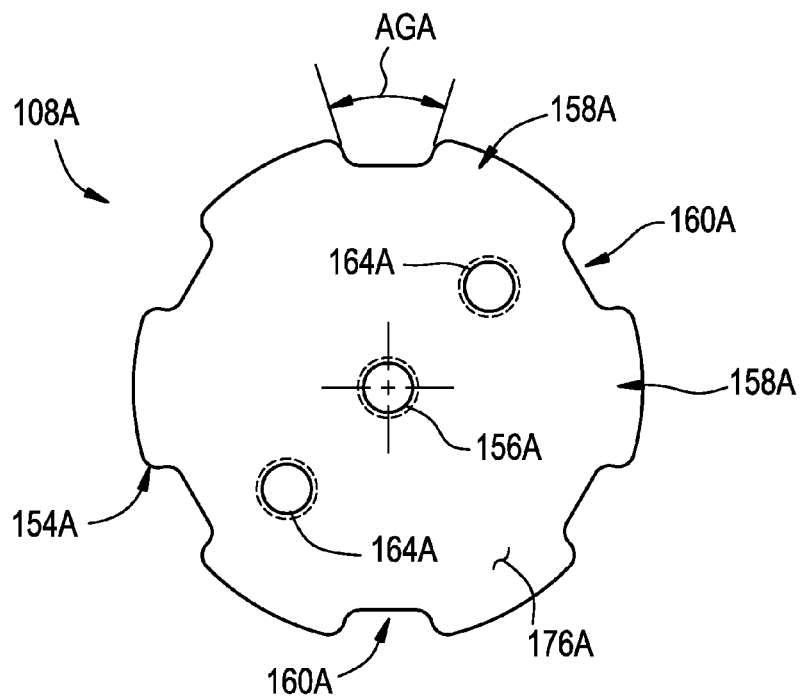
FIG. 10 is a top plan view of one component of the exemplary internal mounting element shown in FIGS. 4-9.
Figure 11:
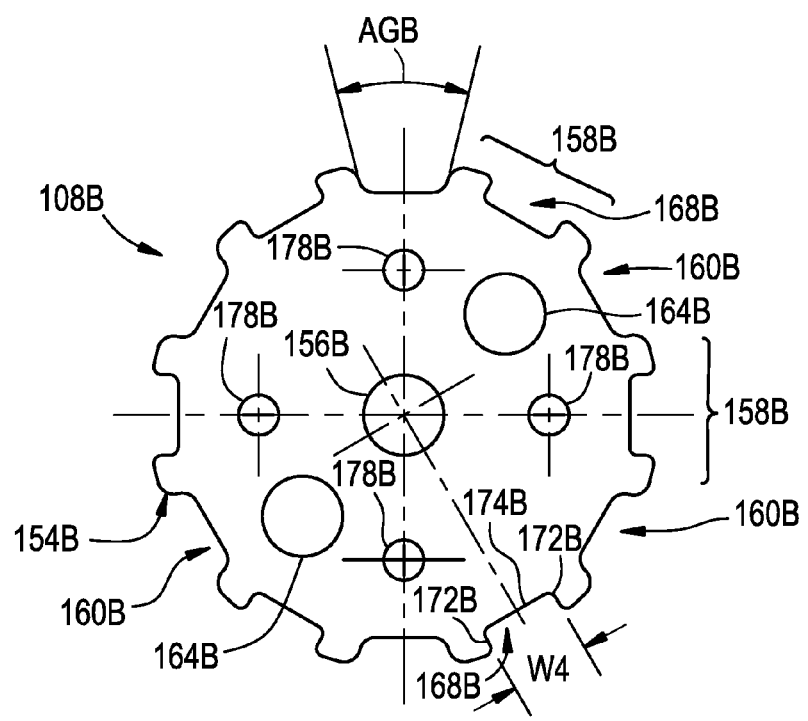
FIG. 11 is a top plan view of another component of the exemplary internal mounting element shown in FIG. 4-9.

As a further example, internal mounting element 108 could be formed from two or more component parts, which are identified as parts 108A and 108B in FIGS. 10 and 11, respectively, that are assembled together to form the internal mounting element, such as is shown in FIGS. 4-11, for example. In such case, certain geometries can be formed into each of the two or more component parts such that the resulting assembly includes one or more of the above-describe or other features can be formed thereby. For example, component part 108A is shown as including a plurality of projections 158A and a plurality of interprojection spaces 160A that are disposed along outer peripheral wall 154A. Part 108A also includes a passage 156A and a pair of spaced passages 164A that each extend through part 108A and include a plurality of threads. Additionally, part 108A can include a side (not shown) that corresponds to side 152 of the internal mounting element and an opposing side 176A that at least partially defines bottom surface 170 of recesses 168 after assembly.

Component part 108B is also shown as including a plurality of projections 158B and a plurality of interprojection spaces 160B that are disposed along outer peripheral wall 154B and cooperate with projections 158A and spaces 160A of component part 108A to form projections 158 and interprojection spaces 160, as described above. In some cases, the side wall portions that at least partially define spaces 160A and 160B can be disposed at a common angle relative to one another, such as is indicated in FIGS. 10 and 11 by angular dimensions AGA and AGB. Part 108B is shown as including clearance holes 156B and 164B that extend through the part and cooperate with threaded passages 156B and 164B, respectively, to form securement features 156 and 164, as described above. Component part 1086 further includes notches 168B that extend into projections 158B from along outer peripheral wall 154B, and include opposing side surfaces 172B and an inner end surface 174B. Notches 168B together with surfaces 172B, 174B and side 176A at least partially define recesses 168, such as have been described above, upon assembly of component parts 108A and 108B together with one another. It will be appreciated that component parts 108A and 108B can be secured together to form internal mounting element 108 in any suitable manner. As one example, one or more securement devices (e.g., threaded fasteners, rivets) could be used. As another example, one or more flowed-material joints could be used. In the exemplary arrangement shown, component part 108B includes a plurality of holes 178B that extend through the component part. A plurality of flowed material joints 180 can be formed between the two component parts on, along or otherwise within holes 178B, such as are illustrated in FIGS. 4, 5 and 7-9, for example.

As described above, internal mounting element 108 is received and secured within receiving chamber 136 of receiving element 102. As such, in a preferred arrangement, side 150 of internal mounting element 108 will be disposed in spaced relation to a distal portion of receiving element 102, such as end surface 140 of flange portion 138 of side wall 132, for example, as is represented in FIG. 4 by reference dimension D1. In such case, an external mounting element (e.g., external mounting element 110 or 210), if provided, or, alternately, a suspension component (e.g., suspension component 106, 206 or 306) can be secured in tension between the internal mounting element and the associated structural component (e.g., structural component SC1 or receiving element 102, 202, 302 thereof).

External mounting element 110 (or 210), if provided, can include a base wall 182 that has opposing sides 184 (FIG. 4) and 186 (FIG. 4). Side 184 is shown disposed in facing relation with end surface 140 of flange portion 138 of receiving element 102. In some cases, side 184 may abuttingly engage end surface 140. However, in other cases, side 184 may be maintained in spaced relation to end surface 140. For example, external mounting element 110 can optionally include side walls 188 (FIG. 1) that extend from base wall 182 in a direction toward the associated structural component (e.g., structural component SC1). Depending upon the application and use of mounting bracket assembly 104, external mounting element 110 may include side walls 188 that are dimensioned to position side 184 in spaced relation to end surface 140. In other cases, however, the side walls may be dimensioned such that side 184 is disposed in abutting engagement with end surface 140. Additionally, external mounting element 110 can optionally include end walls 190 (FIG. 1) that extend from along side walls 188 and may be adapted to abuttingly engage the associate structural component (e.g., structural component SC1). In this manner, forces and loads carried or otherwise applied to the external mounting element can be transmitted, communicated or otherwise transferred to the associate structural component, either directly (i.e., solely through side walls 188) or in combination with receiving element 102 (i.e., through side walls 188 and/or through side 184 of base wall 182 engaging the receiving element).

A mounting bracket kit can include an internal mounting element, such as internal mounting element 108, 208 or 308, for example, one or more securement devices, such as securement devices 112, 212 or 310, for example, and directions for installing the components of the kit on the associate structural component. Such directions can take the form of written, audio or video instructions that recite one or more of the foregoing steps and actions.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic," and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A suspension assembly operatively disposed between associated sprung and unsprung masses of an associated vehicle, said suspension assembly comprising:
a receiving element operatively connected to one of the associated sprung and unsprung masses, said receiving element having a longitudinal axis and including an end wall disposed in transverse relation to said axis, a side wall extending axially from along said end wall toward an open end such that a receiving cavity is at least partially defined within said receiving element by said side wall, and a plurality of retainment surfaces facing toward said end wall and disposed in spaced relation to one another along said side wall within said receiving cavity such that a plurality of gaps are formed therebetween, said receiving element oriented such that said end wall is disposed toward said one of the associated sprung and unsprung masses and such that said open end is disposed toward the other of the associated sprung and unsprung masses;
an internal mounting element at least partially received in said receiving cavity of said receiving element, said internal mounting element including a first side, a second side opposite said first side, an outer peripheral edge extending between said first and second sides and a plurality of recesses extending into said internal mounting element along said first side adjacent said outer peripheral edge, said outer peripheral edge at least partially defining a plurality of projections and a plurality of interprojection spaces disposed about said internal mounting element with one of said plurality of interprojection spaces disposed between adjacent ones of said plurality of projections, said internal mounting element oriented within said receiving cavity of said receiving element such that said second side is disposed toward said end wall and such that at least one of said plurality of retainment surfaces is received in one of said plurality of recesses along said first side of said internal mounting element; and,
a suspension component operatively secured to said one of the associated sprung and unsprung masses through at least said internal mounting element and said receiving element, and said suspension component adapted to operatively engage the other of the associate sprung and unsprung masses.

2. The suspension assembly according to claim 1, wherein said suspension component is one of a gas spring, a jounce bumper and a height sensing device.

3. The suspension assembly according to claim 2, wherein said suspension component is said gas spring with said gas spring including a first end member operatively secured to said mounting element, a second end member spaced from said first end member and operatively secured to the other of the associate sprung and unsprung masses, and a flexible wall operatively connected between said first and second end members and at least partially defining a spring chamber.

4. The suspension assembly according to claim 2, wherein said suspension component is said jounce bumper with said jounce bumper supported along said one of the associate sprung and unsprung masses and in spaced relation to the other of the sprung and unsprung masses.

5. The suspension assembly according to claim 2, wherein said suspension component is-a said height sensor with said height sensor including a sensor body operatively secured to said mounting element and at least one linkage element operatively connected between said sensor body and the other of the associated sprung and unsprung masses.

6. The suspension assembly according to claim 1 further comprising an external mounting element secured to said internal mounting element and abuttingly engaging at least one of said receiving element and said one of the associated sprung and unsprung masses.

7. The suspension assembly according to claim 6, wherein said external mounting element is removably secured in spaced relation to said internal mounting element by way of a securement element operatively interconnecting said internal mounting element and said external mounting element.

8. The suspension assembly according to claim 1, wherein said plurality of gaps of said receiving element have an inner width dimension and said plurality of projections of said internal mounting element have an outer width dimension that is less than said inner width dimension of said plurality of gaps such that upon alignment of said plurality of projections with said plurality of gaps, said internal mounting element can be displaced axially inwardly into said receiving cavity such that at least a portion of said internal mounting element is disposed inwardly beyond said plurality of retainment surfaces.

9. The suspension assembly according to claim 1, wherein said receiving element includes a plurality of tabs projecting inward from along said side wall and said plurality of tabs each include at least one of said retainment surfaces.

10. The suspension assembly according to claim 9, wherein said plurality of recesses include a bottom surface and said plurality of retainment surfaces are received in said plurality of recesses such that at least one of said plurality of retainment surfaces abuttingly engages said bottom surface of at least one of said plurality of recesses.

11. The suspension assembly according to claim 9, wherein said plurality of tabs have a width dimension and at least one of said plurality of recesses includes a pair of opposing side walls spaced apart a distance greater than said width dimension of at least one of said tabs such that at least one of said plurality of tabs is at least partially received within at least one of said plurality of recesses between said side walls thereof.

12. The suspension assembly according to claim 1 further comprising a biasing element operatively engaging said internal mounting element and operative to urge said internal mounting element in an axial direction away from said one of the associate sprung and unsprung masses.

13. A mounting bracket assembly for securing an associated suspension component along one of an associated sprung mass and an associated unsprung mass of an associated vehicle, the one of the associated sprung and unsprung masses including an associated receiving element having a longitudinal axis and including an end wall disposed in transverse relation to the axis, a side wall extending axially from along the end wall toward an open end such that a receiving cavity is at least partially defined within the receiving element by the side wall, and a plurality of retainment surfaces facing toward the end wall and disposed in spaced relation to one another along the side wall within the receiving cavity such that a plurality of gaps are formed therebetween, the associated receiving element being oriented such that the end wall is disposed toward the one of the associated sprung and unsprung masses and such that the open end is disposed toward the other of the associated sprung and unsprung masses, said mounting bracket assembly comprising:

an internal mounting element including a first side, a second side opposite said first side, a securement feature accessible from along at least one of said first and second sides, an outer peripheral edge extending between said first and second sides and a plurality of recesses extending into said internal mounting element along said first side adjacent said outer peripheral edge, said outer peripheral edge at least partially defining a plurality of projections and a plurality of interprojection spaces disposed about said internal mounting element with one of said plurality of interprojection spaces disposed between adjacent ones of said plurality of projections, said plurality of projections dimensioned for passage through the plurality of gaps formed between adjacent ones of the plurality of retainment surfaces of the associated receiving element such that said internal mounting element can be oriented within the receiving cavity of the receiving element with the second side is disposed toward the end wall of the associated receiving element and such that at least one of the plurality of retainment surfaces can be received in one of said plurality of recesses along said first side of said internal mounting element;

an external mounting element including a base wall dimensioned for securement on the one of the associated sprung and unsprung masses adjacent the associated receiving element and securable in spaced relation to said internal mounting element, said base wall including a first side disposed in facing relation to said internal mounting element, a second side opposite said first side and a passage that extends through said base wall such that said securement feature of said internal mounting element is accessible therethrough; and, a securement element dimensioned to engage said securement feature of said internal mounting element and thereby secure said internal mounting element and said external mounting element in spaced relation to one another on the one of the associated sprung and unsprung masses adjacent the associated receiving element.

14. The mounting bracket assembly according to claim 13 further comprising at least one biasing element operatively engaging said internal mounting element and operative to urge said internal mounting element in a direction toward said external mounting element.

15. The mounting bracket assembly according to claim 13, wherein said first side of said base wall of said external mounting element abuttingly engages the associated receiving element.

16. An internal mounting bracket for securing an associated suspension component along one of an associated sprung mass and an associated unsprung mass of an associated vehicle, the one of the associated sprung and unsprung masses including an associated receiving element having a longitudinal axis and including an end wall disposed in transverse relation to the axis, a side wall extending axially from along the end wall toward an open end such that a receiving cavity is at least partially defined within the receiving element by the side wall, and a plurality of retainment surfaces facing toward the end wall and disposed in spaced relation to one another along the side wall within the receiving cavity such that a plurality of gaps are formed therebetween, the associated receiving element being oriented such that the end wall is disposed toward the one of the associated sprung and unsprung masses and such that the open end is disposed toward the other of the associated sprung and unsprung masses, said internal mounting bracket comprising:

an internal mounting element including a first side, a second side opposite said first side, a securement feature accessible from along at least one of said first and second sides, an outer peripheral edge extending between said first and second sides and a plurality of recesses extending into said internal mounting element along said first side adjacent said outer peripheral edge, said outer peripheral edge at least partially defining a plurality of projections and a plurality of interprojection spaces disposed about said internal mounting element with one of said plurality of interprojection spaces disposed between adjacent ones of said plurality of projections, said plurality of projections dimensioned for passage through the plurality of gaps formed between adjacent ones of the plurality of retainment surfaces of the associated receiving element such that said internal mounting element can be oriented within the receiving cavity of the receiving element with the second side disposed toward the end wall of the associated receiving element and such that at least one of the plurality of retainment surfaces can be received in one of said plurality of recesses along said first side of said internal mounting element; and, at least one biasing element operatively engaging said internal mounting element, said at least one biasing element projecting outwardly beyond said second side of said internal mounting element and abuttingly engaging at least one of the associated receiving element and the one of the associated sprung and unsprung masses.

17. A mounting bracket kit for securement along one of an associated sprung mass and an associated unsprung mass of an associated vehicle, the one of the associated sprung and unsprung masses including an associated receiving element having a longitudinal axis and including an end wall disposed in transverse relation to the axis, a side wall extending axially from along the end wall toward an open end such that a receiving cavity is at least partially defined within the receiving element by the side wall, and a plurality of retainment surfaces facing toward the end wall and disposed in spaced relation to one another along the side wall within the receiving cavity such that a plurality of gaps are formed therebetween, the associated receiving element being oriented such that the end wall is disposed toward the one of the associated sprung and unsprung masses and such that the open end is disposed toward the other of the associated sprung and unsprung masses, said mounting bracket kit comprising:

an internal mounting element including a first side, a second side opposite said first side, a securement feature accessible from along at least one of said first and second sides, an outer peripheral edge extending between said first and second sides and a plurality of recesses extending into said internal mounting element along said first side adjacent said outer peripheral edge, said outer peripheral edge at least partially defining a plurality of projections and a plurality of interprojection spaces disposed about said internal mounting element with one of said plurality of interprojection spaces disposed between adjacent ones of said plurality of projections, said plurality of projections dimensioned for passage through the plurality of gaps formed between adjacent ones of the plurality of retainment surfaces of the associated receiving element such that said internal mounting element can be oriented within the receiving cavity of the receiving element with the second side disposed toward the end wall of the associated receiving element and such that at least one of the plurality of retainment surfaces can be received in one of said plurality of recesses along said first side of said internal mounting element;

an external mounting element including a base wall dimensioned for securement on the one of the associated sprung and unsprung masses adjacent the associated receiving element and securable in spaced relation to said internal mounting element, said base wall including a first side disposed in facing relation to said internal mounting element, a second side opposite said first side and a passage that extends through said base wall such that said securement feature of said internal mounting element is accessible therethrough;

a securement element dimensioned to engage said securement feature of said internal mounting element and thereby secure said internal mounting element and said external mounting element in spaced relation to one another on the one of the associated sprung and unsprung masses adjacent the associated receiving element; and, directions for securing said internal mounting element and said external mounting elements on the one of the associate sprung and unsprung masses.

18. The mounting bracket kit according to claim 17, wherein said directions are instructions including actions of:
positioning said internal mounting element such that said second side is in facing relation with the end wall of the receiving element;
orienting said internal mounting element such that said plurality of projections are at least approximately aligned with the plurality of gaps along the side wall of the receiving element;
inserting said internal mounting element into the receiving cavity of the receiving element such that at least a portion of said first side is disposed axially inwardly beyond the plurality of retainment surfaces of the receiving element; and,
displacing said internal mounting element such that at least one of said plurality of recesses is disposed in approximate alignment with and abuttingly engages one of the plurality of retainment surfaces.

19. The mounting bracket kit according to claim 18 further comprising a biasing element, said instructions including an action of operatively engaging said biasing element with said internal mounting element such that said one biasing element projects outwardly beyond said second side of said internal mounting element and abuttingly engaging at least one of the associated receiving element and the one of the associated sprung and unsprung masses.

20. The mounting bracket kit according to claim 18 further comprising a suspension component, said instructions including an action of operatively connecting said suspension component to said external mounting element.

\* \* \* \* \*

UNITED STATES PATENT AND TRADEMARK OFFICE
CERTIFICATE OF CORRECTION

PATENT NO. : 8,950,765 B2  
APPLICATION NO. : 13/990763  
DATED : February 10, 2015  
INVENTOR(S) : Munchel et al.

Page 1 of 1

It is certified that error appears in the above-identified patent and that said Letters Patent is hereby corrected as shown below:

In the Claims

In column 16, line 24, claim 5, delete "is-a" and insert -- is --.

Signed and Sealed this
Ninth Day of June, 2015

Michelle K. Lee
*Director of the United States Patent and Trademark Office*